(12) United States Patent
Borsarelli et al.

(10) Patent No.: US 7,264,108 B2
(45) Date of Patent: Sep. 4, 2007

(54) TRANSFER UNIT FOR TRANSFERRING GLASS ARTICLES

(75) Inventors: Gianclaudio Borsarelli, Cuneo (IT); Paolo Gianti, Busca (IT); Carlo Sesia, Cuneo (IT); Bruno Viada, Madonna Delle Grazie (IT)

(73) Assignee: Bottero S.p.A. (IT)

( * ) Notice: Subject to any disclaimer, the term of this patent is extended or adjusted under 35 U.S.C. 154(b) by 0 days.

(21) Appl. No.: 11/206,396

(22) Filed: Aug. 18, 2005

(65) Prior Publication Data

US 2006/0037841 A1 Feb. 23, 2006

(30) Foreign Application Priority Data

Aug. 18, 2004 (IT) .................. TO 2004 A 000570

(51) Int. Cl.
*B65G 25/00* (2006.01)
(52) U.S. Cl. .................. 198/429; 198/430; 198/468.1
(58) Field of Classification Search ................ 198/429, 198/430, 468.1, 468.11
See application file for complete search history.

(56) References Cited

U.S. PATENT DOCUMENTS

| | | | | | |
|---|---|---|---|---|---|
| 3,184,031 | A | * | 5/1965 | Dunlap | 198/430 |
| 3,550,789 | A | * | 12/1970 | Jaeger et al. | 198/430 |
| 3,583,862 | A | | 6/1971 | Stacey | |
| 3,929,234 | A | * | 12/1975 | Warren | 414/737 |
| 3,994,387 | A | * | 11/1976 | Zappia | 198/430 |
| 4,364,467 | A | * | 12/1982 | Blakelock | 198/429 |
| 4,614,473 | A | * | 9/1986 | Kwauka et al. | 414/792.6 |
| 4,660,711 | A | * | 4/1987 | Alonso et al. | 198/430 |
| 4,715,114 | A | * | 12/1987 | Yajima | 29/809 |
| 4,830,653 | A | | 5/1989 | Montemayor-Quiroga et al. | |
| 4,978,274 | A | * | 12/1990 | de Groot | 414/744.3 |
| 5,044,488 | A | * | 9/1991 | Bolin | 198/430 |
| 5,343,999 | A | * | 9/1994 | Yoshida et al. | 198/468.11 |
| 5,413,454 | A | * | 5/1995 | Movsesian | 414/729 |
| 5,429,651 | A | * | 7/1995 | Bolin | 65/241 |
| 5,456,561 | A | * | 10/1995 | Poduje et al. | 414/744.5 |
| 5,814,120 | A | | 9/1998 | Lloyd et al. | |
| 5,893,447 | A | * | 4/1999 | Brintazzoli | 198/343.2 |
| 5,942,188 | A | * | 8/1999 | Lepper et al. | 422/62 |
| 6,035,995 | A | * | 3/2000 | Leidy et al. | 198/430 |
| 6,076,654 | A | * | 6/2000 | Leidy | 198/429 |
| 6,220,424 | B1 | * | 4/2001 | Fluck | 198/468.6 |
| 6,601,468 | B2 | * | 8/2003 | Grover et al. | 74/490.03 |
| 6,783,317 | B2 | * | 8/2004 | Claeys | 414/788.1 |
| 6,826,977 | B2 | * | 12/2004 | Grover et al. | 74/490.03 |
| 6,948,608 | B2 | * | 9/2005 | Monti | 198/426 |

FOREIGN PATENT DOCUMENTS

DE 2004 007 507 A1 2/2004

(Continued)

*Primary Examiner*—Joe Dillon, Jr.
(74) *Attorney, Agent, or Firm*—Ostrolenk, Faber, Gerb & Soffen, LLP

(57) ABSTRACT

A transfer unit for transferring glass articles from a supporting surface to a carry-off conveyor, the transfer unit includes a pickup member for engaging the articles for transfer and is hinged to one end of an actuating arm to rotate with respect to the actuating arm about a movable hinge axis under the control of a control unit for adjusting the position of the pickup member independently of the position of the actuating arm.

13 Claims, 3 Drawing Sheets

FOREIGN PATENT DOCUMENTS

| | | |
|---|---|---|
| EP | 1 134 198 A1 | 9/2001 |
| EP | 1 571 130 A2 | 9/2005 |
| EP | 1 577 271 A2 | 9/2005 |
| EP | 1 577 272 A2 | 9/2005 |
| WO | WO 2005/085145 A1 | 9/2005 |

* cited by examiner

TRANSFER UNIT FOR TRANSFERRING GLASS ARTICLES

The present invention relates to a transfer unit for transferring glass articles.

BACKGROUND OF THE INVENTION

As is known, hollow glass articles are formed in aligned, adjacent molds, and, once molded, are extracted from the respective molds and placed on a supporting surface, from which they are subsequently transferred onto a linear conveyor which feeds them successively to an output of the system.

The glass articles are transferred from the supporting surface to the linear conveyor by means of transfer units, each of which comprises a pickup member for engaging one or more articles to be transferred; a movable supporting arm fitted integrally with the pickup member; a pneumatic linear actuator for moving the supporting arm and the pickup member horizontally to and from the glass articles; and an angular actuator, normally electric, for rotating the supporting arm, about a fixed vertical hinge axis, between a pickup position, to pick the articles off the supporting surface, and a release position, to release the articles onto the linear conveyor.

With the increase in the output rate of molding systems, known transfer units of the type described above have proved increasingly unsatisfactory and unreliable. This is mainly due in part to the presence of pneumatic actuators, the efficiency and controllability of which are severely affected by the thermal conditions in which the transfer unit operates, and in part to the pickup member being connected integrally to the supporting arm, so that it is extremely difficult to set and rapidly correct the pickup positions, the release positions onto the conveyor, and, above all, the travel trajectories of the articles between the pickup and release positions. This has to be done mainly on account of the different shape and size of the articles for manufacture, and the fact that the articles picked up by the pickup member travel along different trajectories to the conveyor, which are not always the best for ensuring correct transfer of the articles, with the result that numerous damaged articles are rejected at the molding system output.

SUMMARY OF THE INVENTION

It is an object of the present invention to provide a transfer unit designed to provide a straightforward, low-cost solution to the above problems, and which, at the same time, is compact and cheap and easy to produce.

According to the present invention, there is provided a transfer unit for transferring glass articles from a supporting surface to a carry-off conveyor; the unit comprising a fixed support, a pickup member for engaging the articles for transfer, and an actuating arm for activating said pickup member; characterized in that said pickup member is hinged to said actuating arm to rotate, with respect to the actuating arm, about a movable hinge axis; control means being provided to adjust the position of said pickup member about said movable hinge axis independently of the position of said actuating arm.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
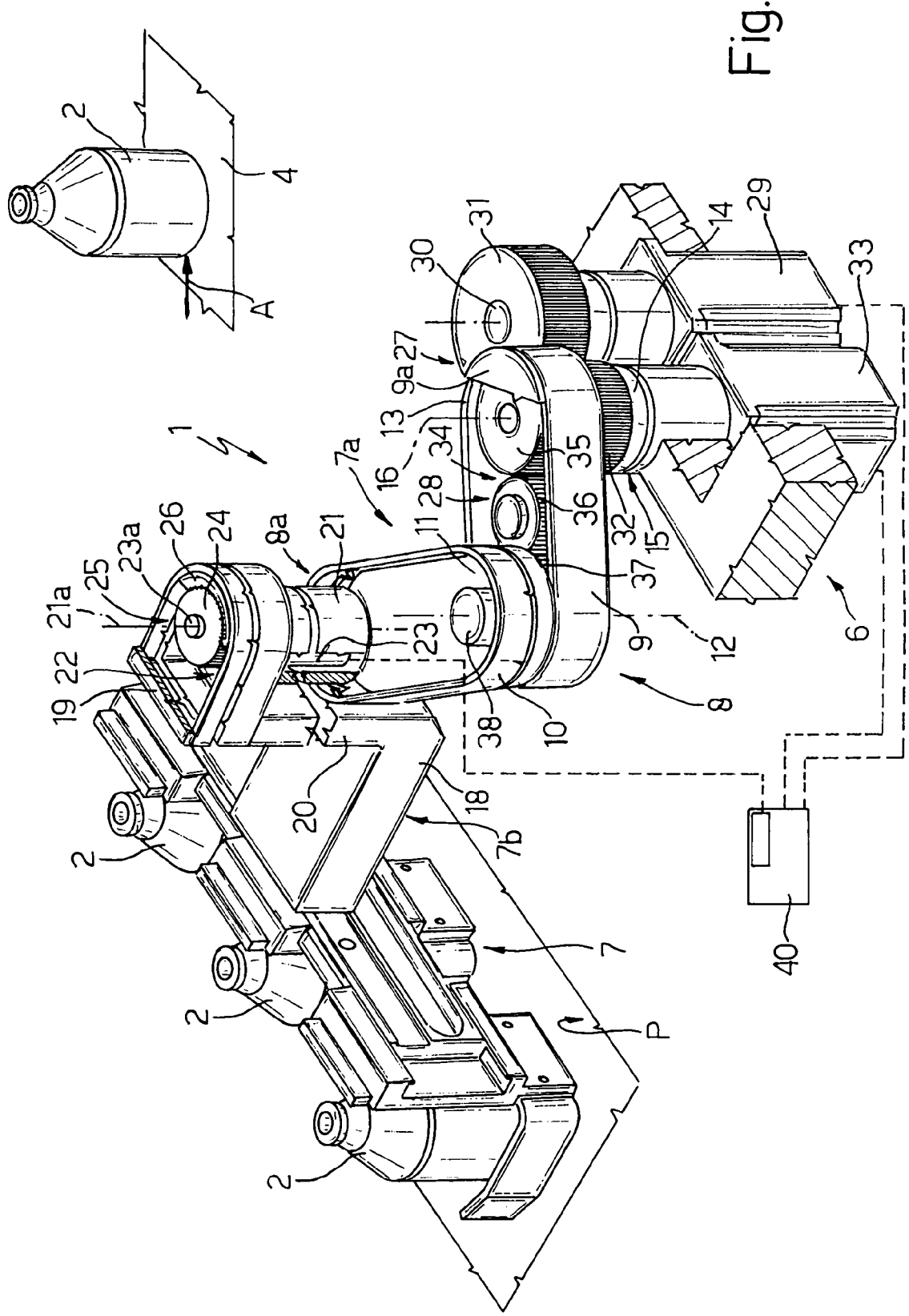
FIG. 1 shows a side view in perspective, with parts removed for clarity, of a first preferred embodiment of the transfer unit according to the present invention.

Number 1 in FIG. 1 indicates as a whole a transfer unit for transferring glass articles 2 from a fixed supporting surface P to a belt conveyor 4 (shown partly) for conveying articles 2 in a direction A to an output of the molding system (not shown) on which articles 2 are molded.

Transfer unit 1 comprises a fixed supporting frame 6 extending beneath supporting surface P; a known pickup and moving member 7 for engaging articles 2 for transfer; and an actuating device 7a for activating pickup member 7. Device 7a comprises a single articulated arm 8 interposed between pickup member 7 and frame 6, and in turn comprising only two hollow elongated portions 9 and 10. Portions 9 and 10 extend parallel to and over supporting surface P, and are connected to each other by a hinge 11 to rotate, with respect to each other, about a movable hinge axis 12 perpendicular to surface P. With reference to FIG. 1, portion 9 comprises an end portion 13, opposite the end portion hinged to portion 10, from which a tubular pin 14 projects downwards. Pin 14 is connected integrally to end portion 13, and is connected to frame 6 by a hinge 15 to rotate in axially-fixed manner about a fixed hinge axis 16 coincident with the axis of pin 14 and perpendicular to surface P.

The end 8a of arm 8 opposite the end hinged to frame 6 is fitted with pickup member 7, a Z-shaped arm 7b of which comprises two transversely spaced end portions 18 and 19 parallel to surface P, and an intermediate portion 20 extending outwards of end 8a, between portions 18 and 19, and perpendicular to surface P.

End 8a of arm 8 is fitted integrally with a tubular pin 21, which extends upwards, coaxially with an axis 21a perpendicular to surface P and to portion 10, and is positioned facing portions 19 and 20 of arm 7b, which form part of a heat shield for protecting the pin from the article 2 area. Portion 19 is fitted to the top end of tubular pin 21 by a known hinge 22, not described in detail, to rotate in axially-fixed manner about axis 21a.

With reference to FIG. 1, tubular pin 21 houses an electric motor reducer 23 connected integrally to portion 10 and having an output shaft 23a coaxial with axis 21a, and an end portion of which projects inside portion 19. The end portion of shaft 23a is fitted with a pinion 24 of a gear transmission 25, an inner gear 26 of which is housed inside, and connected integrally to, portion 19. Portion 19 surrounds transmission 25 to define a shield for mechanically protecting transmission 25, while pin 21 defines a shield for mechanically protecting motor reducer 23 and located in series with the mechanical shield defined by portions 19 and 20.

In the embodiment described, the distance between axes 12 and 16 equals the distance between axes 12 and 21a, whereas, in a variation not shown, said distances differ.

The movements of portions 9 and 10 with respect to each other and with respect to frame 6 are controlled by two separate, independent, powered actuating assemblies 27 and 28 forming part of device 7a. Assembly 27, in use, rotates portion 9 about axis 16 with respect to frame 6, extends entirely beneath supporting surface P, and comprises an electric motor reducer 29 connected to frame 6 with its output shaft 30 parallel to axis 16. Assembly 27 also comprises two meshing gears 31 and 32, of which gear 31 is fitted to shaft 30, and gear 32 is fitted to pin 14 coaxially with axis 16.

Assembly 28 rotates portion 10 about axis 12 with respect to portion 9, and comprises an electric motor reducer 33 fitted to frame 6, coaxially with axis 16 and adjacent to motor reducer 29. Motor reducer 33 drives a gear transmission 34 housed inside portion 9, which is closed by a cover 9a to define a shield for mechanically protecting transmission 34. In the embodiment shown, transmission 34 comprises an input gear 35 fitted to the output shaft of motor reducer 33; an intermediate gear 36; and an output gear 37, which is fitted to an intermediate pin 38 coaxial with axis 12 and connected integrally to portion 10.

Motor reducers 23, 29, 33 are connected electrically to a known control unit 40, which controls motor reducers 23, 29, 33 independently to move pickup member 7 between a pickup position, shown in FIG. 1, to pick articles 2 off supporting surface P, and a release position to release articles 2 onto conveyor 4.

Figure 2:
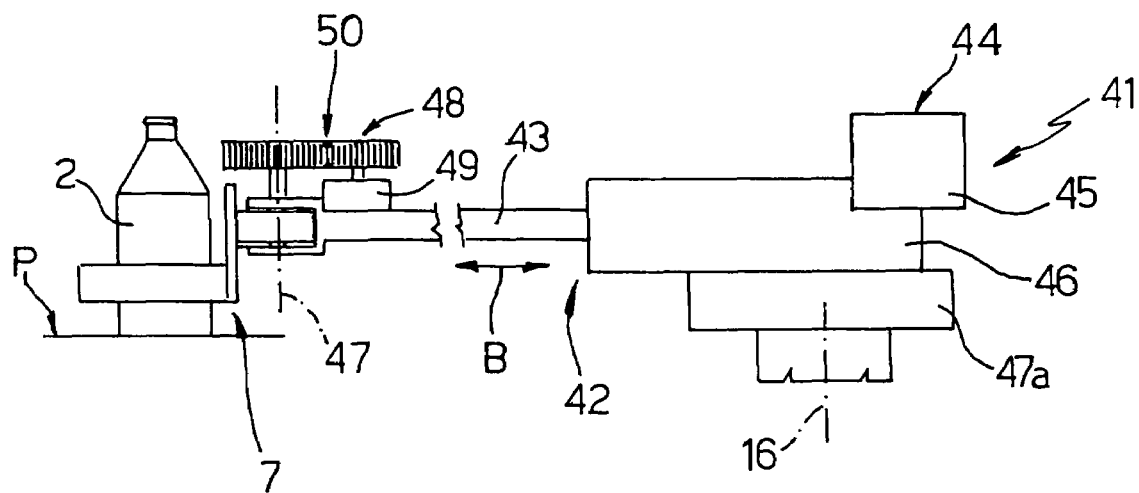
FIG. 2 shows, schematically and substantially in block form, a second preferred embodiment of the transfer unit according to the present invention.

The variation shown schematically in FIG. 2 relates to a transfer unit 41, which differs from unit 1 by pickup member 7 being activated by an actuating device 42 comprising a rigid rod-like arm 43 instead of arm 8. Arm 43 is moved back and forth in direction B to and from articles 2 on supporting surface P by an actuating unit 44 comprising an electric motor 45 and a gear transmission 46. Arm 43 and actuating unit 44 are supported on a powered table 47a rotating about fixed axis 16.

Pickup and moving member 7 is hinged to the free end of arm 43, and is rotated about a movable axis 47 by a dedicated actuating unit 48 comprising an electric motor 49 fitted to arm 43, and a known transmission 50.

Figure 3:
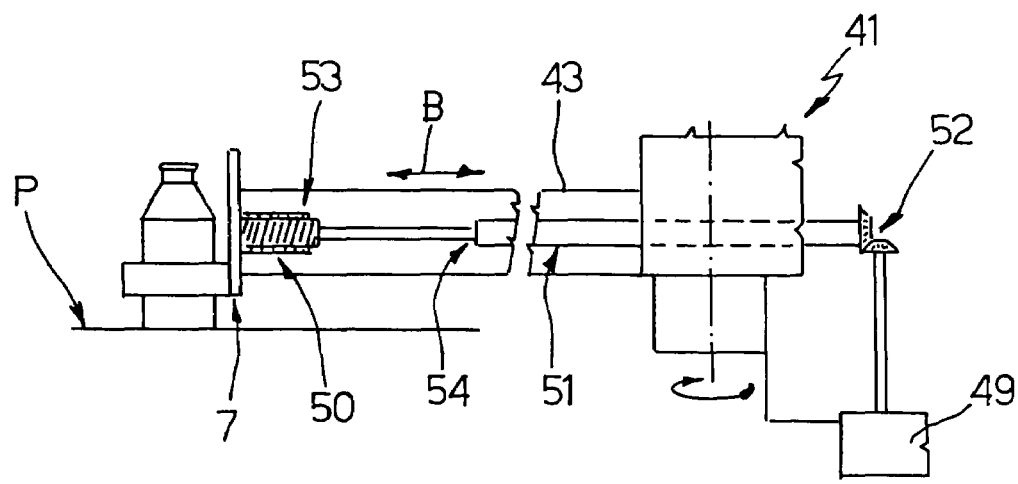
FIG. 3 shows, schematically, a variation of a detail in FIG. 2.

In the FIG. 3 variation, electric motor 49 is located below supporting surface P, and is connected to the pickup member by a mechanism 51 comprising a bevel-gear transmission 52, a worm-helical gear transmission 53, and a splined transmission shaft 54 interposed between transmissions 52 and 53 and extending inside arm 43.

Figure 4:
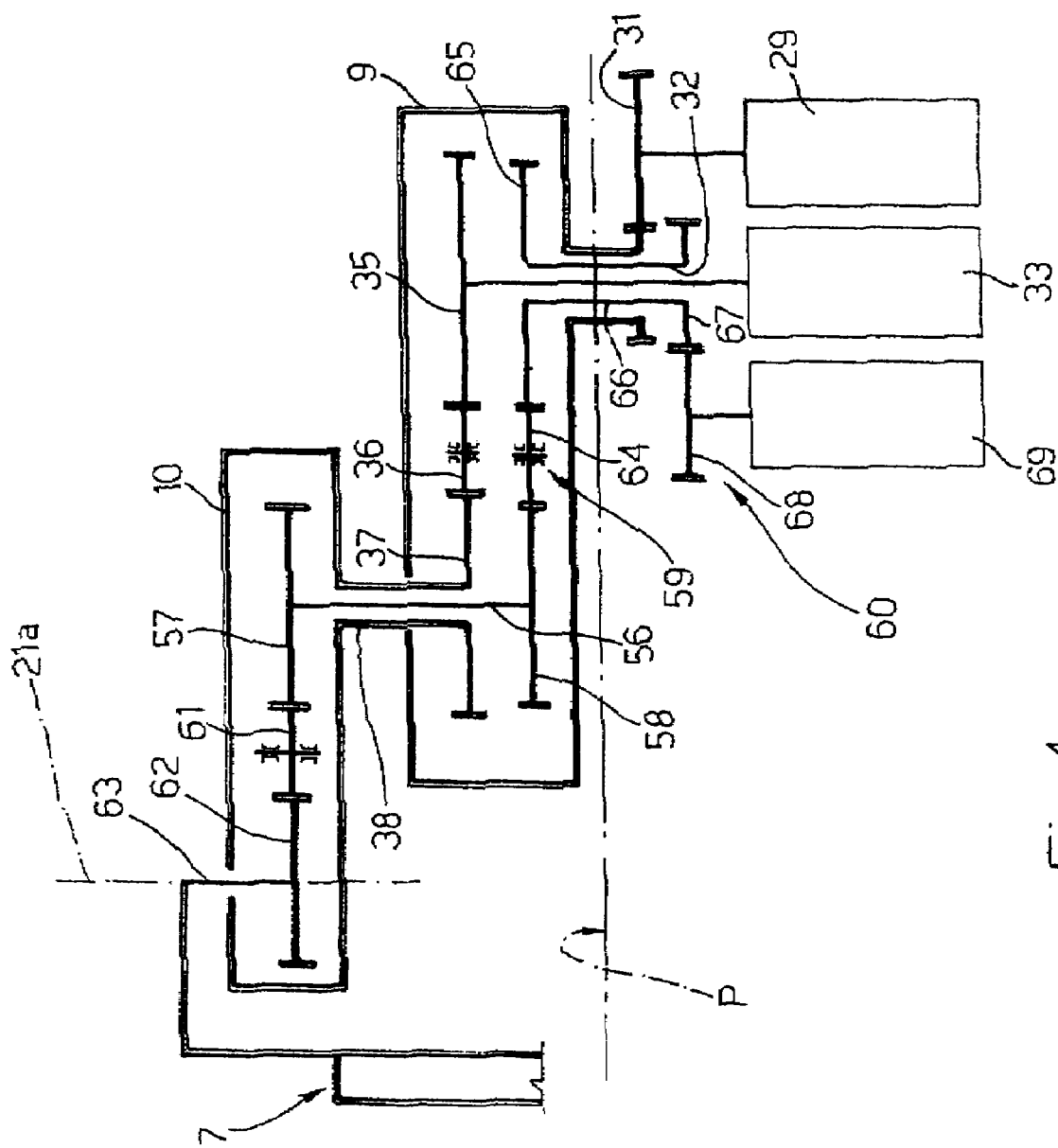
FIG. 4 shows, schematically, a variation of a detail in FIG. 1.

In the FIG. 4 variation, pin 38 is a hollow pin fitted through loosely with a transmission shaft 56 coaxial with axis 12, and the opposite axial ends of which are fitted with two gears 57 and 58 forming part of a transmission 59 of a powered actuating device 60 for rotating pickup and moving member 7 about axis 21a with respect to portion 10. Transmission 59 also comprises an intermediate gear 61 which meshes with gear 57 and with a gear 62 fitted to a pin 63 connected integrally to the pickup member 7 and coaxial with axis 21a. The transmission also comprises a further intermediate gear 64 meshing with gear 58 and with a drive gear 65 fitted to one end of a hollow shaft 66, which is coaxial with the output shaft of motor reducer 33, and the opposite end of which is fitted with a gear 67 meshing with a gear 68 fitted to the output shaft of a motor reducer 69 located beneath surface P and alongside motor reducer 33.

As will be clear from the foregoing description, the characteristics of units 1 and 41 as described herein, and in particular the possibility of freely and continuously adjusting the position of member 7 with respect to the end portion of the relative supporting and actuating arm 8, 43, provide for obtaining efficient, reliable transfer units regardless of the output rate of the system and the size and arrangement of articles 2 on both supporting surface P and belt conveyor 4. This is mainly due to the possibility of freely orienting pickup member 7 with respect to relative arm 8, 43 to avoid interference with articles 2, both when engaging and releasing articles 2, and to prevent articles 2 clashing with or sliding with respect to member 7 when transferring the articles to conveyor 4. More specifically, adjusting member 7 about axes 21a and 47 provides for selecting, setting, changing, or maintaining the trajectory of articles 2 to conveyor 4, which is extremely important when simultaneously transferring more than two articles 2, in which case, the trajectory of each article 2 differs from the others. This provides for improving the stability and preventing detachment of the transferred articles, but above all for eliminating devices (e.g. air jets, etc.) normally required to hold the transferred articles on the pickup and moving member, i.e. to counteract the spin effect, thus simplifying and reducing the cost of the system.

Optimum trajectory setting is even further enhanced in unit 1 featuring an articulated arm 8 comprising component parts activated by respective independent motors/motor reducers.

In addition to being freely configurable, the efficiency and reliability of units 1 and 41 described are also enhanced by the units comprising intrinsically straightforward component parts of proven reliability, and by the more exposed parts being protected by mechanical shields or being located beneath supporting surface P of articles 2 and therefore in thermally safe areas.

From the organization and maintenance standpoint, units 1 and 41 provide for dispensing with dedicated pickup and moving units, until now indispensable in certain transfer conditions, as, for example, when forming two parallel lines of articles on the conveyor.

Moreover, using electric motors/motor reducers solves any problems posed, as in known solutions, by the use of pressurized operating fluids requiring routine control and maintenance.

Clearly, changes may be made to transfer units 1 and 41 as described herein without, however, departing from the scope of the present invention. In particular, arms 8 and 43 for activating member 7 may differ from those described by way of example, as may the arrangement of the various motors/motor reducers. More specifically, the transmissions interposed between motor 49, motor reducer 69 and member 7 may differ from those described by way of example, especially when the motors/motor reducers are located below supporting surface P and therefore at a distance from member 7.

The invention claimed is:

1. A transfer unit for transferring glass articles from a supporting surface to a carry-off conveyor, the transfer unit comprising:
   a fixed support;
   a pickup member for engaging the articles for transfer;
   an actuating arm for activating said pickup member, said actuating arm being pivotably attached to the fixed support, said pickup member being positioned at a free end of the actuating arm hinged to said actuating arm to rotate with respect to the actuating arm about a movable hinge axis, the movable hinge axis being perpendicular to the supporting surface; and
   a control unit provided to adjust the position of said pickup member about said movable hinge axis independently of the position of said actuating arm, and to control the actuating arm.

2. The unit as claimed in claim 1, wherein said control unit adjusts the position of said pickup member continuously with respect to said actuating arm.

3. The unit as claimed in claim 1, wherein said control unit comprises a dedicated electric motor.

4. The unit as claimed in claim 3, wherein said electric motor is located beneath said supporting surface.

5. The unit as claimed in claim 3, wherein said electric motor is carried by said actuating arm.

6. The unit as claimed in claim 4, wherein said control unit also comprises a transmission interposed between said pickup member and said electric motor.

7. The unit as claimed in claim 6, wherein said transmission is a gear transmission.

8. A transfer unit for transferring glass articles from a supporting surface to a carry-off conveyor, the transfer unit comprising:
   a fixed support;
   a pickup member for engaging the articles for transfer;
   an actuating arm for activating said pickup member, said actuating arm being pivotably attached to the fixed support, said pickup member being hinged to said actuating arm to rotate with respect to the actuating arm about a movable hinge axis perpendicular to the supporting surface;
   a control unit provided to adjust the position of said pickup member about said movable hinge axis independently of the position of said actuating arm,
   wherein said actuating arm is an articulated arm comprising a first elongated portion hinged to said fixed support to rotate about a fixed hinge axis, and at least a second elongated portion connected to the first elongated portion to rotate about a further movable hinge axis, and to rotate with respect to the pickup member about said movable hinge axis; and
   an electric actuating unit provided to rotate said first and second elongated portion with respect to each other and with respect to said fixed support.

9. The unit as claimed in claim 8, wherein said electric motor is activated independently of said electric actuating unit.

10. The unit as claimed in claim 8, wherein said electric actuating unit comprises a first and a second electric motor, and further control unit for controlling said first and said second electric motor independently of each other.

11. The unit as claimed in claim 10, wherein said first and said second electric motors are located beneath said supporting surface.

12. The unit as claimed in claim 11, wherein said first and said second electric motors are located adjacent to each other.

13. The unit as claimed in claim 8, wherein said electric actuating also comprises a first mechanical transmission activated by said first electric motor to rotate said first elongated portion about said fixed hinge axis, and a second mechanical transmission activated by said second electric motor to rotate the first and second elongated portions with respect to each other about said further movable hinge axis, at least one of said mechanical transmissions being located beneath said supporting surface.

* * * * *